United States Patent

[11] 3,553,362

[72] Inventor Frank W. Mounts
Colts Necks, N.J.
[21] Appl. No. 820,537
[22] Filed Apr. 30, 1969
[45] Patented Jan. 5, 1971
[73] Assignee Bell Telephone Laboratories Incorporated
Murray Hill, N.J.
a corporation of New Jersey

[54] CONDITIONAL REPLENISHMENT VIDEO SYSTEM WITH RUN LENGTH CODING OF POSITION
14 Claims, 4 Drawing Figs.

[52] U.S. Cl. .......... 178/7.1, 178/6, 179/15.55
[51] Int. Cl. .......... H04b 1/66
[50] Field of Search .......... 178/6BWR, 6.8(considered); 179/15.55; 325/38.1

[56] References Cited
UNITED STATES PATENTS

| | | | |
|---|---|---|---|
| 3,185,824 | 5/1965 | Blasbalg et al. .......... | 179/15.55 |
| 3,225,333 | 12/1965 | Vinal .......... | 179/15.55 |
| 3,378,641 | 4/1968 | Varsos et al. .......... | 179/15.55 |

*Primary Examiner*—Robert L. Griffin
*Assistant Examiner*—Donald E. Stout
*Attorneys*—R. J. Guenther and E. W. Adams, Jr.

ABSTRACT: A redundancy reduction system is described for processing video signals by comparing each amplitude sample derived from the video signal with a stored sample corresponding to the amplitude at the same spatial point location in a previous video frame. If a significant difference exists between the new sample and the stored sample, the amplitude for the new sample is selected for transmission to a receiving location. An address word is generated with each sample to indicate the location of that sample in a video line. When samples in two or more adjacent spatial point locations are selected for transmission, only the address word corresponding to the first location is transmitted. A code word, whose value indicates the number of samples in addition to the first which are to be associated with this single address word, is transmitted prior to the amplitude values for these additional samples. A synchronization word is transmitted between the samples in adjacent video lines in order to maintain line synchronization with the receiver.

PATENTED JAN 5 1971 3,553,362

INVENTOR
F. W. MOUNTS
BY David D. Dubosky
ATTORNEY

CONDITIONAL REPLENISHMENT VIDEO SYSTEM WITH RUN LENGTH CODING OF POSITION

BACKGROUND OF THE INVENTION

This invention relates to redundancy reduction systems, and more particularly, to redundancy reduction systems for use with video signals.

It is well known in the video art that video signals tend to have a large amount of redundancy from one video frame to the next. This redundancy results from the fact that there is very little change or movement in the scene being viewed during the interval required for the transmission of one video frame. To eliminate this frame-to-frame redundancy and thereby reduce the number of bits which must be transmitted to a receiving location, a redundancy reduction system was disclosed in the copending application by F. W. Mounts, Ser. No. 749,770 filed Aug. 2, 1968, in which system the sample from a video signal is transmitted only if that sample represents a significant change from the amplitude of the sample having the same location in the previous video frame. At a receiving location, the transmitted sample is used to update or replenish its corresponding sample in a receiving frame memory. Since the decision to send a sample of the video signal is a conditional determination these systems have been labeled by those skilled in the art as conditional replenishment video systems.

In order to properly place a transmitted sample in a conditional replenishment video system at the receiving end, each sample must be accompanied by an address word or position word which dictates to the receiver the proper location of that sample within the video frame. In the above-identified copending application the number of bits utilized for addressing a sample was reduced by requiring the sample to be located within its video line only, rather than within an entire video frame. Line synchronization was maintained between the transmitting and receiving locations by transmitting a unique address word for the first sample in the video frame and further by forcing the transmission of the first sample in each video line whether or not that sample represented a significant change. As a result of this arrangement the number of bits necessary for addressing in a video signal of the type used in connection with video telephone service was reduced to eight bits. Nevertheless, each transmitted sample had to be accompanied by an address word in order to properly position the sample at the receiving location.

SUMMARY OF THE INVENTION

In a study of the samples which are selected for transmission in a conditional replenishment video system it has been determined that large numbers of the selected samples tend to occur in clusters, that is, large numbers of the samples selected for transmission have adjacent address locations. Accordingly, a primary object of the present invention is to reduce the number of bits required for addressing purposes in a conditional replenishment video system through utilization of this experimental determination.

This object and others are achieved in accordance with the present invention wherein a delay line frame memory stores an entire frame of video samples. Each new sample derived from the video signal is compared with its corresponding stored sample having the same time location in a video frame. A threshold logic circuit determines whether the new sample represents a significant change and if it does, a transmit signal is generated. For each new sample an address generator provides a digital word at its output whose value indicates the position of that sample within the video line. A group word assembler responds to a generated transmit signal from the threshold circuit by connecting the amplitude and address of the selected new sample to a buffer memory. Following the amplitude and address of the selected sample, the group word assembler couples to the buffer memory a code word whose value indicates the number of samples selected for transmission which follow the sample corresponding to the transmitted address. The group word assembler then couples to the buffer memory the amplitude words corresponding to these additional samples without any address words.

In accordance with one embodiment of the present invention, selection of a number of additional samples greater than the number which can be indicated by the value of a single code word results in the repetition of the entire complete cycle, that is, in the transmission of another sample and its corresponding address, followed by a second code word whose value indicates the number of additional samples following this second address. In accordance with a second embodiment of the present invention selection of a number of samples equal to or greater than the maximum number which can be indicated by the value of a single code word results in the transmission of a second code word only, without any additional address word. The value of this code word simply indicates the number of additional samples which will follow without address words.

BRIEF DESCRIPTION OF THE DRAWINGS

The operation of the invention will be more readily understood when the following detailed description is read in conjunction with the drawings in which.

DETAILED DESCRIPTION

Figure 1:
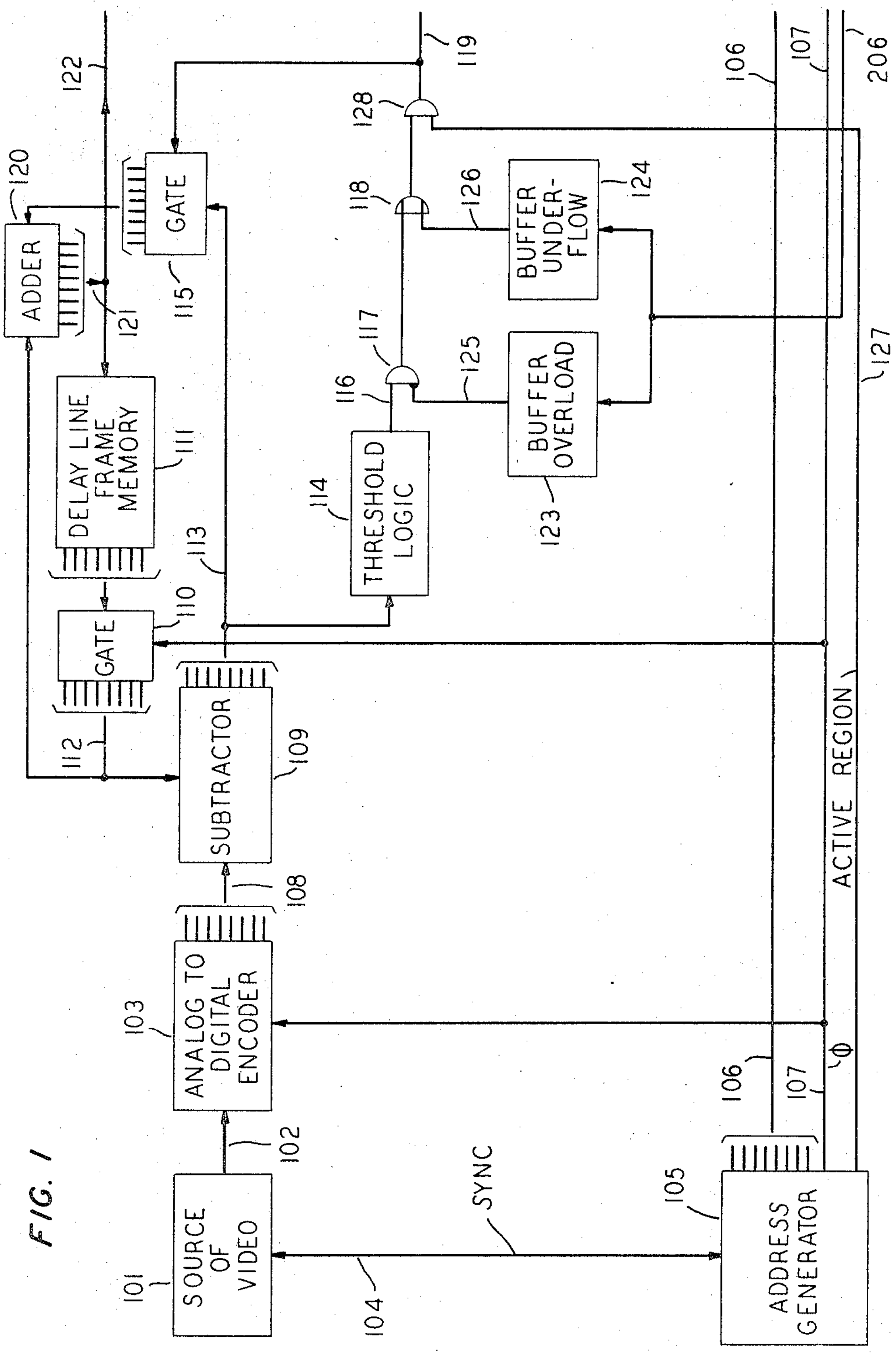
FIGS. 1 and 2, when joined by connecting the identically designated lines (with FIG. 1 to the left of FIG. 2) show a schematic block diagram of one embodiment of the present invention.

In FIG. 1 an analogue video signal of the standard type with intervals called frames and subintervals called lines separated by horizontal and vertical blanking intervals is provided by a source of video 101 on line 102. This video signal on line 102 is periodically sampled by an analogue-to-digital encoder 103 at a rate dictated by the energizing pulses provided on line 107 by an address generator 105. Analogue-to-digital encoder 103 provides a digital word on bus 108 for each sampling, the value of the digital word being equal to the amplitude of the sample. Address generator 105, in addition to providing the energizing pulses on line 107 at the sampling rate, also provides a digital word on bus 106 hereinafter called an address word whose value is an indication of the position of the video sample within its video line. To insure synchronization between address generator 105 and source of video 101, a synchronization line is provided by way of line 104. Synchronization may originate in either the source of video 101 or address generator 105. In either case, the value of the digital word on bus 106 remains the same for any given sample position within a video line. Buses 106 and 108 like all other lines referred to hereinafter as buses, are actually a plurality of transmission paths, one for each of the bits in the digital word said to be transmitted over the bus.

Each digital word on bus 108 is coupled to one input of a subtractor circuit 109. The other input of subtractor circuit 109 is connected to receive a digital word whose value indicates the amplitude of the sample taken for the same spatial point in a previous video frame. This digital word for the same spatial point in a previous video frame is provided by the output of a delay line frame memory 111 which output is coupled through transmission gate 110 by way of bus 112 to subtractor circuit 109 when an energizing pulse appears on line 107. Delay line frame memory 111 contains an entire frame of amplitude values corresponding to the samples taken by analogue-to-digital encoder 103 for an entire video frame. The delay time of frame memory 111 is such that a sample which has been coupled to its input will appear at its output one frame time later. The manner by which an entire frame of video samples are coupled into frame memory 111 will be more readily appreciated after the description of the operation of the remainder of the apparatus in FIG. 1.

Subtractor circuit 109 provides a digital word on its output bus 113 whose value is equal to the difference between the digital word provided on bus 108 and the digital word provided on bus 112. A threshold logic circuit 114 compares the digital word on bus 113 with a built-in predetermined threshold level. If the absolute magnitude of the difference represented by the digital word on bus 113 is greater than the predetermined threshold level of circuit 114, an energizing signal is produced on line 116.

Assuming for the moment that the inhibit input of AND gate 117 is not energized, the energizing signal on line 116 is coupled through AND gate 117 and then through an OR gate 118 to one input of an AND gate 128. The other input of AND gate 128 is connected by way of line 127 to address generator 105. If the sample presently being considered on bus 108 is from the active portion of a video line (that is, not from the horizontal or vertical blanking intervals), address generator 105 provides an energizing signal on line 127. Hence if the sample being considered is from the active region of the picture, the energizing signal out of OR gate 118 is coupled through AND gate 128 to line 119. When an energizing signal is delivered to line 119, such as when the difference has exceeded the predetermined threshold level and has therefore been deemed to be significant, the control input of a transmission gate 115 is energized and the digital difference word on bus 113 is coupled through transmission gate 115 to one input of an adder circuit 120. The other input of adder circuit 120 is connected to receive the digital word on bus 112. The output bus 121 from adder circuit 120 is connected directly to the input of delay line frame memory 111. Accordingly, if an energizing signal is produced on line 119 at the output of AND gate 128, the difference on bus 113 is added to the old amplitude sample represented by the digital word on bus 112 in order to provide a digital word to the input of frame memory 111 whose value is equal to that of the new amplitude sample provided on bus 108. If, however, no energizing signal is produced on line 119 such as when the change is not deemed to be significant, the old amplitude sample on bus 112 is simply coupled through adder circuit 120 to the input of frame memory 111. In this way, the amplitude samples within frame memory 111 are constantly recirculated and updated only when an energizing signal is produced on line 119 such as when the change in amplitude of a new sample represents a significant change.

Figure 2:
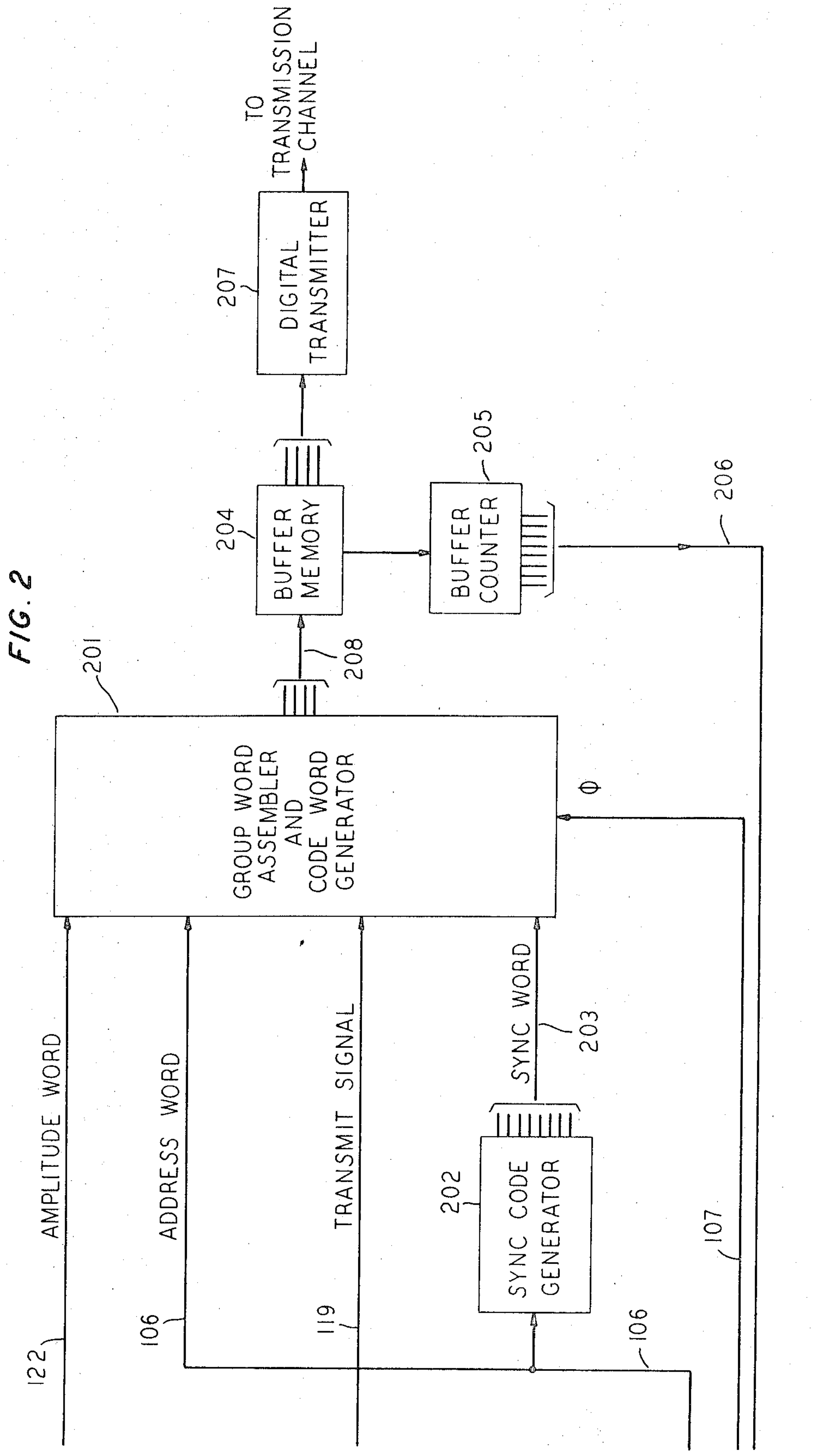

The digital word coupled to the input of frame memory 111 by adder circuit 120 is also coupled by way of bus 122 to the input of a group word assembler and code word generator 201. As pointed out hereinabove the value of the digital word on bus 122 is equal in magnitude to the digital word on bus 108 when an energizing signal is present on line 119. This energizing signal is designated in FIG. 2 as a transmit signal. Also coupled to the input of group word assembler and code word generator 201 are the address word on bus 106 from address generator 105, the transmit signal on line 119 from AND gate 128, a synchronization word on bus 203, and finally, the energizing pulse on line 107.

Group word assembler and code word generator 201 responds to the first receipt of a transmit signal on line 119 in a wait-and-see fashion. Upon receiving the first sample to be accompanied by a transmit signal, the group word assembler and code word generator 201 stores the amplitude and address word corresponding to that transmit signal and waits to see how many samples will follow with transmit signals in adjacent address locations. For all succeeding samples after the first sample with a transmit signal, only the amplitude words are stored. A running count is kept of the number of samples in addition to the first sample whose amplitudes are to be transmitted in conjunction with the single address word. A predetermined interval after receiving the first sample with a transmit signal, the group word assembler and code word generator 201 couples the amplitude and address word for the first sample with a transmit signal, plus a run-length code word whose value indicates the number of address locations following that first sample which have resulted in transmit signals, plus the amplitude words for all of these additional address locations to a buffer memory 204.

In a situation where a single isolated sample is to be transmitted, the code word is still transmitted even though its value is zero since the receiver must still be informed that no additional amplitude words are associated with the transmitted address word. As indicated hereinabove however, sample changes requiring transmission of the amplitude tend to occur in groups or clusters. Hence, in most instances the present invention results in a large increase in efficiency since only one address word and a code word are transmitted for an entire group of amplitude words. In the case of a video telephone system where eight bits are utilized for amplitude and eight bits for the address word, a four-bit code word permits the transmission of up to fifteen additional samples with a single address word.

The address developed by generator 105 on bus 106 during the horizontal blanking interval is recognized by a sync code generator 202 as belonging to the blanking interval, and in response thereto, generator 202 develops a synchronization word on bus 203. This sync word on bus 203 is unique in that it is distinguishable from amplitude and address words. Group word assembler and code word generator 201 detects the presence of the sync word on bus 203 and in response to its presence, couples the sync word to buffer memory 204. As a result, the receiver is line synchronized to the transmitter, and the address words from generator 105 need only indicate the position of a sample within its video line.

If the number of samples in the run of changed samples exceeds the maximum value which can be represented by the run-length code word, another address word and code word are transmitted by the embodiment to be described hereinafter and shown in FIG. 3. In the second embodiment for the group word assembler and code word generator 201 which is shown in FIG. 4, a group of changed samples in excess of the maximum which can be indicated by a single code word results in the transmission of additional code words only, the value of each code word representing the number of additional samples whose amplitude values are to follow it. In this second embodiment of FIG. 4, no address word other than the first is transmitted as long as the transmitted samples have adjacent address locations. In either the FIG. 3 or FIG. 4 embodiment, whenever a sample occurs that is not to be transmitted, that is, whenever a sample without a transmit signal occurs, the cluster or group is terminated, and the next sample amplitude to be transmitted is accompanied by its address word and a code word.

The digital words appearing on bus 208 at the output of group word assembler and code word generator 201 occur at random and therefore are coupled into a buffer memory 204 prior to their connection to a digital transmitter 207. The number of words stored in buffer memory 204 is registered in a buffer counter circuit 205. Each time that a new word is stored in buffer memory 204, the count in buffer counter 205 is advanced by one, and each time that a word is read out of buffer memory 204 the count in buffer counter 205 is decreased by one. Accordingly, the digital word provided on bus 206 by counter 205 provides a continuous indication of the number of words stored in buffer memory 204.

The digital word on bus 206 is coupled to the inputs of a buffer overload circuit 123 and buffer underflow circuit 124, both in FIG. 1. If the number of words stored in buffer memory 204 is indicated by the digital word on bus 206 to be within a predetermined number of words of the maximum capacity of storage in the buffer memory, buffer overload circuit 123 provides an energizing signal on line 125 to the inhibit input of AND gate 117. As a result, AND gate 117 is prohibited from passing the energizing pulse on line 116 when the buffer memory 204 is in danger of being overloaded. Consequently, even though significant changes may occur at this time, they are not permitted to be coupled through to the buffer memory. If, on the other hand, the buffer memory has very few words in storage, there is a possibility that no words will be available for transmission during long intervals when no samples are to be selected, such as during the vertical blanking interval. To always provide a minimum number of words in storage in buffer memory 204, buffer underflow circuit 124 responds to any value on bus 206 which is equal to or less than a predetermined value, and in response thereto provides an energizing pulse on line 126 to the input of OR gate 118. As a result, a transmit signal may be generated on line 119 during the active region indicating that the amplitude word on bus 122 is to be coupled to buffer memory 204 even though that word does not represent a significant change in amplitude.

The digital words stored in buffer memory 204 are read out and coupled by way of a digital transmitter 207 to a high capacity transmission channel. Digital transmitter 207 converts the digital words provided in parallel form by buffer memory 204 to a serial bit stream on the transmission channel in a manner well known to those skilled in the pulse code modulation art.

Figure 3:
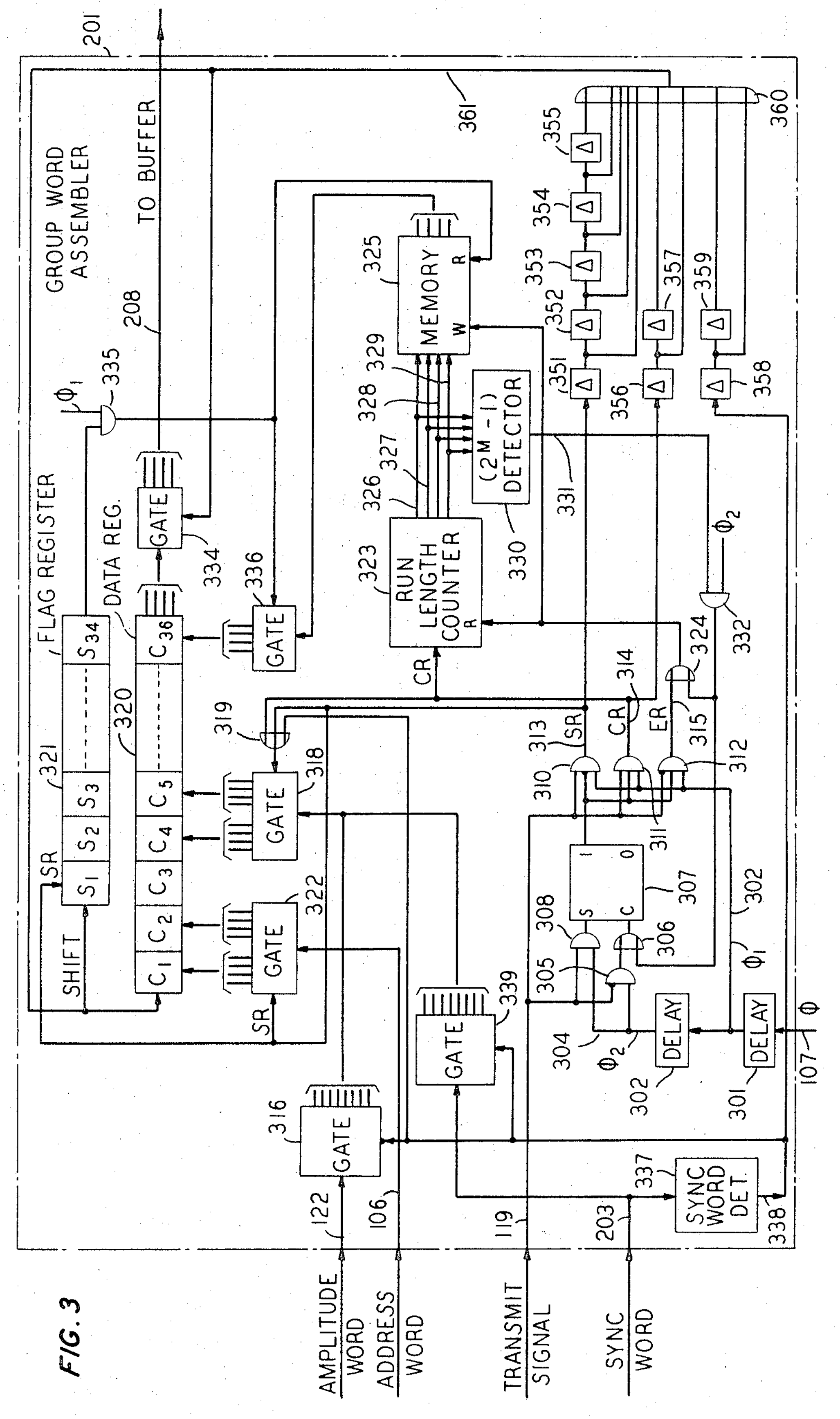
FIG. 3 shows a schematic block diagram of one embodiment of a circuit illustrated as a block in FIG. 2.
Figure 4:
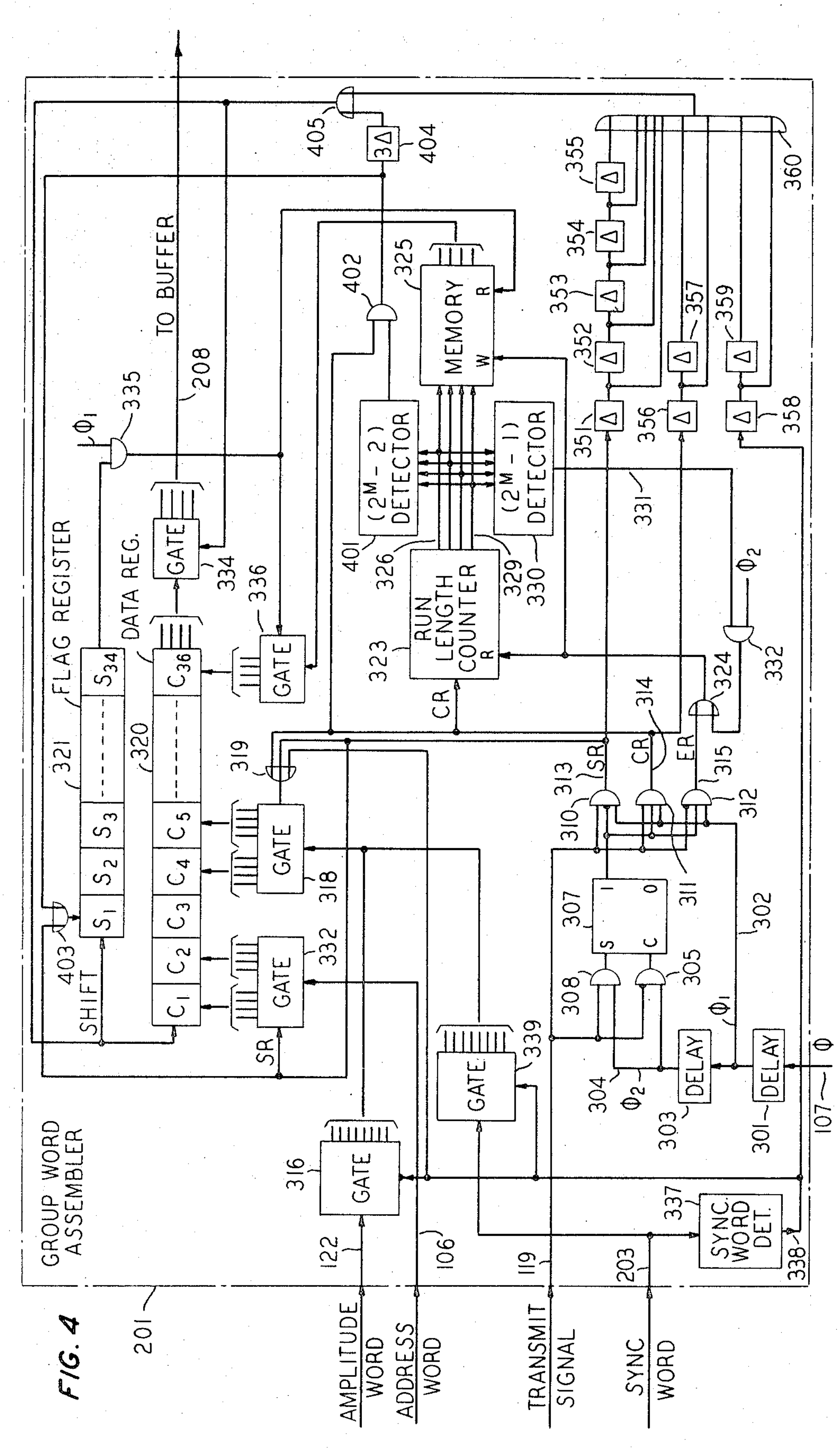
FIG. 4 shows a schematic block diagram of a second embodiment of the same circuit illustrated as a block in FIG. 2.

One embodiment for the group word assembler and code word generator 201 is shown in FIG. 3 of the drawings. As indicated hereinabove, this apparatus is designed to reduce the number of bits necessary for addressing purposes in those cases where a run or group of amplitude changes occur in adjacent address locations. Accordingly, for the purposes of describing the operation of the apparatus shown in FIG. 3 it will be assumed that the video signal being processed has produced a run or group of amplitude changes in adjacent address locations. Operation of the apparatus in the case where a single isolated sample is to be transmitted will be readily apparent to those skilled in the art.

As pointed out hereinabove, each time that an energizing pulse in pulse train $\Phi$ appears on line 107, a sample is taken of the video signal on line 102 and the amplitude and address of that sample are presented in digital form on buses 122 and 106, respectively, provided the sample is accompanied with a transmit signal. In FIG. 3, each energizing pulse on line 107 is coupled through a delay circuit 301 to provide an energizing pulse on line 302, designated in FIG. 3 as belonging to pulse train $\Phi_1$. Each energizing pulse on line 302 is then coupled through a delay circuit 303 to provide an energizing pulse on line 304, designated in FIG. 3 as belonging to pulse train $\Phi_2$. The delay in circuits 301 and 303 is short enough to that the pulses appear on lines 302 and 304 before the next appearance of an energizing pulse on line 107. As a result, each sampling interval during which the amplitude word and address word for a particular sample appear on buses 122 and 106, respectively, is divided into three subintervals. These subintervals are referred to hereinbelow as a first subinterval equal to the period of time between the rise of the pulse on line 107 in pulse train $\Phi$ and the rise of the pulse on line 302 in pulse train $\Phi_1$; a second subinterval equal to the period of time between the rise of the pulse on line 302 and the rise of the pulse on line 304 in pulse train $\Phi_2$; and finally, a third subinterval equal to the period of time between the rise of the pulse on line 304 and the rise of the next pulse in pulse train $\Phi$ on line 107.

The transmit signal on line 119, if present, is present during each of the three subintervals. This transmit signal is connected to an input of an AND gate 308 and an inhibit input of an AND gate 305. The other two inputs of both AND gates 308 and 305 are energized by the energizing pulse on line 304. AND gate 308, when energized, causes a flip-flop 307 to be set. The output of AND gate 305 is connected to one input of an OR gate 306 whose output is connected to the clear input of flip-flop 307. Hence, when AND gate 305 is energized, flip-flop 307 is cleared. Accordingly, flip-flop 307 is either set or cleared by the pulse in pulse train $\Phi_2$ depending on whether or not a transmit signal is present on line 119. If the transmit signal is present, flip-flop 307 is set during the third subinterval, whereas if the transmit signal is not present, flip-flop 307 is cleared during the third subinterval of a sampling period.

The transmit signal on line 119 is also connected to an input of each of two AND gates 310 and 311 and is also connected to the inhibit input of an AND gate 312. The logical 1 output from flip-flop 307 which provides an energizing signal when flip-flop 307 is in its set state, is connected to an inhibit input of AND gate 310 and to an input of each of the AND gates 311 and 312. Each of the AND gates 310, 311 and 312 has a third input connected to the output of delay circuit 301 to receive the energizing pulse in pulse train $\Phi_1$.

If a transmit signal is not present on line 119 during a sampling interval, the energizing pulse on line 304 will clear flip-flop 307 during the third timing subinterval. If then a transmit signal is present on line 119 during the next sampling interval AND gate 310 will be energized by the pulse in pulse train $\Phi_1$ on line 302 during the second timing subinterval. During this second subinterval, the transmit signal on line 119 has not yet been effective in setting flip-flop 307 since the flip-flop is set or cleated only during the third subinterval when the pulse is present in pulse train $\Phi_2$. Accordingly, an energizing signal from the logical 1 output of flip-flop 307 is not present during this second timing subinterval and therefore AND gate 311 is not energized. AND gate 312 is also not energized since it is inhibited by the presence of the transmit signal on line 119. As a result, the presence of a transmit signal on line 119 following a sampling period during which no such transmit signal was present causes AND gate 310 to be energized and produce an energizing signal on line 313, designated in the drawings by the letters SR to indicate a start-of-run.

During the third timing subinterval of the sampling period when a transmit signal first appears on line 119, flip-flop 307 is set by the pulse in pulse train $\Phi_2$. The energizing signal produced at this time at the logical 1 output of flip-flop 307 will have no immediate effect on AND gates 310 through 312 since they are only energized during the second timing subinterval.

If a transmit signal appears on line 119 following a sampling period during which a transmit signal had been present on line 119, AND gate 311 will be energized during the second timing interval by the pulse in pulse train $\Phi_1$. The energizing signal produced at the output of AND gate 311 on line 314 is designated in the drawings by the letters CR to indicate a continuing run. AND gates 310 and 312 will not be energized during this sampling period since the energizing signal from flip-flop 307 inhibits AND gate 310 and the transmit signal on line 119 inhibits AND gate 312. During this second sampling period when the transmit signal is present on line 119, flip-flop 307 however will remain in the set state. Accordingly, AND gate 311 will continue to produce continuing-run signals on line 314 (designated as CR in FIG. 3) for succeeding sampling periods as long as transmit signals continue to be present on line 119.

When a sampling period occurs during which a transmit signal is no longer present on line 119, AND gate 312 is energized by the pulse in pulse train $\Phi_1$ during the second timing subinterval to produce an energizing signal on line 315 which is designated in the drawings by the letters ER to indicate an end-of-run. AND gates 310 and 311 will not be energized during this sampling period since the logical 1 output from flip-flop 307 will still inhibit AND gate 310 during the second timing subinterval and AND gate 311 will not be energized since the transmit signal is no longer present on line 119. During this sampling period with no transmit signal, flip-flop 307 is cleared in the third timing subinterval by the pulse on line 304.

In summary, the first appearance of a transmit signal on line 119 will cause a start-of-run signal to appear on line 313. If the transmit signal continues to be present in succeeding sampling periods, a continuing-run signal is produced on line 314 during each of these succeeding sampling periods. An end-of-run signal is produced on line 315 during the first sampling period when the transmit signal is no longer present on line 119.

Each digital redundancy presented on bus 122, representing the amplitude of a sample, is coupled to the input of a transmission gate 316. The path through gate 316 is means closed since the energizing pulse on line 338 at its inhibit control input is normally not present. Consequently, the digital words on bus 122 are normally coupled through gate 316 to the input of a transmission gate 318. When the first sample to be accompanied with a transmit signal appears on bus 122, the start-of-run pulse on line 313 is coupled through OR gate 319 to the control input of transmission gate 318, thereby causing the digital word on bus 122 corresponding to this sample to be coupled through gate 318 into cells $C_4$ and $C_5$ of a data register 320. As indicated hereinabove, the amplitude word in the present embodiment contains eight bits. The four most significant bits of the amplitude word are connected by gate 318 into cell $C_5$ and the four least significant bits are connected into cell $C_4$. Data register 320 is actually constructed of four shift registers each of which has a number of stages equal to the number of cells said to be within data register 320. Each cell of data register 320 therefore consists of four stages, one stage from each of the four shift registers, each of the four stages having the same corresponding position in its shift register. Each one of the four bits said to be stored in one of the cells of data register 320 is stored in one stage of each of the four shift registers.

The number of cells required in data register 320 is related to the number of bits in the code word, which indicates the length of a group of transmitted amplitudes, and to the placement of the code word relative to the address and amplitude of the first selected sample. In the present embodiment where the code word is four bits in length and is to be placed in the data register between the amplitude and address words for the first selected sample, data register 320 must have a minimum number of 36 cells. The cells have been designated in FIG. 3 with numbers $C_1$ through $C_{36}$, the 36th cell being the last cell in which information will be stored before being shifted out of the data register. From the standpoint of practicing the invention, the code word need only precede the amplitude values for the additional samples; it may have any spatial relationship with the address and amplitude for the first selected sample.

Another shift register designated as flag register 321 in FIG. 3 has 34 stages, two less than the data register 320 and is capable of storing a single bit in each of its stages. Since data register 320 and flag register 321 are shifted together by pulses applied by way of line 361 to their shift inputs, a one-to-one correspondence can be thought of as existing between each stage in flag register 321 and a cell in data register 320. It is helpful in understanding the present invention if stage $S_1$ of register 321 is thought of as corresponding to cell $C_3$ of register 320, stage $S_2$ to cell $C_4$, and so on up to stage $S_{34}$ to cell $C_{36}$. Flag register 321 may, in practice, be constructed as a fifth shift register of data register 320 with the first two of 36 stages not used, but for purposes of describing the operation of the apparatus, it is helpful to illustrate it as a separate shift register.

The digital word on bus 106 representing the address of the sample whose amplitude is presented on bus 122 is connected to the input of a transmission gate 322. When a start-of-run pulse appears on line 313, the control input of gate 322 is energized, thereby causing the address word on bus 106 to be coupled into the first and second cell of data register 320. The four most significant bits of the address word are coupled into cell $C_2$ whereas the four least significant bits are coupled into cell $C_1$. No information is coupled into cell $C_3$ and therefore an information space is created between the amplitude and address words for the first selected sample in data register 320. The start-of-run pulse, however, does cause a logical 1 to be entered into stage $S_1$ of flag register 321, that is, into the stage corresponding cell $C_3$.

The start-of-run energizing pulse on line 313 is connected to one end of a tandem connection of five delay networks 351 through 355. The output from delay network 355 and the tap between each of the delay networks 351 through 355 are each connected to one input of an OR gate 360. As a result, a single energizing pulse on line 313 causes five pulses to appear at the output of OR gate 360, the first pulse being delayed in time from the energizIng pulse on line 313 by a time interval of Δ seconds, and each of the other pulses follow with a separation time of Δ seconds. These five delayed pulses out of OR gate 360 are connected by way of line 361 to the shift inputs of data register 320 and flag register 321. As a result, the information stored in cells $C_1$, $C_2$, $C_3$, $C_4$ and $C_5$ is shifted in data register 320 so as to occupy cells $C_6$, $C_7$, $C_8$, $C_9$ and $C_{10}$ after the last of the five delayed pulses from OR gate 360 has been terminated. Similarly, the energizing pulse stored in stage $S_1$ of flag register 321 is also shifted five stages to the right so that after the last of the five delayed pulses from OR gate 360 has terminated, the energizing signal in flag register 321 occupies the stage $S_6$ position.

The time interval of delay networks 351 through 355 is short enough so that the shifting of the information in data register 320 and flag register 321 is completed before the next amplitude word is presented on bus 122. In this way cells $C_4$ and $C_5$ of data register 320 are cleared in preparation to receiving the next amplitude word if that amplitude word has been selected for transmission.

When the second sample in a run of samples to be transmitted appears on bus 122, the corresponding continuing-run pulse on line 314 is coupled through OR gate 319 to the control input of transmission gate 318. As a result, the amplitude word on bus 122 for this second sample is coupled through gate 318 into the fourth and fifth cells of data register 320. No address word for this sample is connected into the data register 320. The energizing pulse on line 314 is also connected through delay networks 356 and 357 to two inputs of OR gate 360 so as to provide two delayed pulses at the output of OR gate 360 separated in time by an interval of Δ seconds with the first one appearing Δ seconds after the energizing pulse on line 314. These two delayed pulses separated in time by a duration of Δ seconds cause the information which is stored in data register 320 to be shifted two cells toward higher numbered cells. Although no information is stored in flag register 321 during a continuing-run pulse, the information previously stored in this flag register is also caused to shift two stages to the right by the two delayed pulses produced by the continuing-run pulse. As a result, the logical 1 previously inserted into flag register 321 maintains a spatial location in flag register 321 corresponding to the empty cell which remains between the amplitude word and address word corresponding to the first sample in a cluster of selected samples having adjacent address locations.

The delays introduced by delay networks 356 and 357 are short enough so that the information is shifted in both data register 320 and flag register 321 before the next sample is presented on bus 122. Accordingly, cells $C_4$ and $C_5$ are cleared of information before the next amplitude word is presented on bus 122. If this next amplitude word is accompanied with a transmit signal, a continuing-run pulse is generated on line 314, the amplitude word corresponding to this sample is coupled through gate 318 into cells $C_4$ and $C_5$ of data register 320, and the information in both of the shift registers is shifted two stages toward the high numbered ends of the registers. The amplitude words for all succeeding samples will continue to be inserted into the fourth and fifth cells of data register 320 as long as these samples are accompanied with transmit signals on line 119.

Each continuing-run pulse on line 314 in addition to being connected to OR gate 319 is also connected to the input of run length counter 323. Since counter 323 is reset to zero each time that an end-of-run pulse is coupled from line 315 through an OR gate 324 to its reset input, the value of the count taken by run length counter 323 indicates the number of amplitude values which have been placed in data register 320 following the address word corresponding to the first sample to be accompanied with a transmit signal. The end-of-run pulse on line 315 in addition to resetting counter 323 through OR gate 324 also energizes the write input of a memory 325 thereby causing the count in counter 323 to be coupled by way of lines 326 through 329 into memory 325. Memory 325 is a random access memory such as a core memory which can be read out on a first-in, first-out basis. Accordingly, the number of samples in excess of the first sample is read into memory 325 each time that a cluster of samples has ended as indicated by an end-of-run pulse on line 315.

If the number of additional samples in a run of samples with transmit signals does not exceed the maximum number which can be indicated by a four-bit code word, the pulse which is provided from OR gate 324 to both reset counter 323 and energize the write input of memory 325 will originate from the end-of-run pulse on line 315. If, however, the number of additional samples in a run of samples with transmit signals exceeds the maximum number which can be indicated by a four-bit code word, a detector 330 having its inputs connected to lines 326 through 329 at the output of counter 323 detects the presence of all logical 1's on each of the lines 326 through 329, and in response thereto produces an energizing signal on line 331. With an energizing signal present on line 331, a pulse from pulse train $\Phi_2$ on line 304 causes an AND gate 332 to be energized thereby producing an energizing pulse at a second input of OR gate 324. This energizing pulse at the second input of OR gate 324 produces the same result as an end-of-run pulse on line 315 in both resetting counter 323 and energizing the write input of memory 325. In addition, the output energizing pulse from AND gate 332 is coupled through OR gate 306 to the clear input of flip-flop 307. Consequently, the apparatus in FIG. 3 reacts to a run of samples in excess of the number which can be indicated by a four-bit code word by separating the run into individual groups each with a maximum length equal to the number which can be indicated by a four-bit code word. The first sample in the second group, even though it represents a significant change in an adjacent address location, will produce the same effect within the apparatus of FIG. 3 as though it were the first sample to be accompanied with a transmit signal.

The energizing pulses from the output of OR gate 360 on line 361, in addition to shifting registers 320 and 321, also enable the control input of a transmission gate 334. As a result, each time that an energizing pulse is present on line 361, the four-bit word stored in cell $C_{36}$ of data register 320 is coupled through transmission gate 334 by way of bus 208 to the buffer memory 204 in FIG. 2. Due to the inherent delay within data register 320 the information is coupled out of cell $C_{36}$ before the information in cell $C_{35}$ is shifted into the 36th cell.

When the logical 1 which was inserted into stage $S_1$ of flag register 321 by a start-of-run pulse reaches the 34th stage of flag register 321, AND gate 335 having one input connected to the output of stage $S_{34}$ is energized by a $\Phi_1$ pulse. At this time when the start-of-run pulse is present in stage $S_{34}$ of flag register 321, cell $C_{36}$ of data register 320 is empty. This empty cell corresponds to the information space which was left in data register 320 between the amplitude word and address word for the first sample of a run of samples to be transmitted. The energizing pulse out of AND gate 335 enables the control input of a transmission gate 336 and also energizes the read input of memory 325. As a result, the oldest information within memory 325 is read out of memory 325 and coupled through gate 336 into cell $C_{36}$ of data register 320. Since this transfer into cell $C_{36}$ is accomplished by a $\Phi_1$ pulse, the information from memory 325 can be read into cell $C_{36}$ before the first shifting pulse on line 361 occurs at an instant $\Delta$ seconds after the $\Phi_1$ pulse interval.

As indicated hereinabove, the umber of bits in the code word utilized in FIG. 3 apparatus is equal to four. With a code word M bits in length, the maximum number of additional samples that can be indicated is equal to $(2^M-1)$. The all logical 0's condition for the code word cannot be used to indicate an additional sample since this condition must be reserved for the case where a single sample with no additional adjacent sample is selected for transmission. Accordingly, with a code word of four bits, 15 additional samples can be indicated. In the event that more than 15 additional samples are present in a cluster, the energizing pulse produced on line 331 by detector 330 causes the 16th additional sample to be accompanied with a transmit signal. Accordingly, this 16th additional sample will produce a start-of-run pulse on line 313 which in turn will cause its amplitude word and address word to be coupled into data register 320 along with an energizing pulse in stage $S_1$ of flag register 321.

As indicated hereinabove, a unique synchronizing word is produced on bus 203 during each of the horizontal blanking intervals. A sync word detector 337 responds to this synchronizing word by producing an energizing pulse at its output on line 338 which in turn enables the control input of transmission gate 339 and inhibits the control input of transmission gate 316. As a result, the synchronizing word on bus 203 is coupled through gate 339 to the input of transmission gate 318 whereas any information present on bus 122 at this time is prevented from coupling through gate 316 to the input of gate 318. Since the synchronizing word on bus 203 occurs during the horizontal blanking interval, the information present on bus 122 at this time is not required to be transmitted. The energizing pulse on line 338 is also coupled through OR gate 319 to the control input of transmission gate 318. Accordingly, the synchronizing word on bus 203 is coupled through gate 318 into cells $C_4$ and $C_5$ of data register 320. Finally, the energizing pulse on line 338 is coupled through delay circuits 358 and 359 to OR gate 360 thereby producing two energizing pulses on line 361 spaced by a time interval equal to $\Delta$ seconds. As a result, a synchronizing word store in cells $C_4$ and $C_5$ of data register 320 is shifted by two cells into higher numbered cells thereby clearing cells $C_4$ and $C_5$ in preparation to receiving the next amplitude word coupled through gate 318.

In FIG. 4 a second embodiment of the group word assembler and code word generator 201 is shown. In this embodiment a run of samples in excess of the maximum number which can be indicated by the four-bit code word results in the transmission of a second code word only, rather than the transmission of a second code word and address word as in FIG. 3. The apparatus shown in FIG. 4 having designating numbers identical to apparatus in FIG. 3 operates in the same fashion as described hereinabove in connection with FIG. 3. The OR gate 306 in FIG. 3 which is present to permit the clearing of flip-flop 307 either by a pulse out of AND gate 332 or by a pulse out of AND gate 305 is not present in FIG. 4. In FIG. 4, the output of AND gate 305 is connected directly to the clear input of flip-flop 307 and AND gate 332 is connected only to the input of OR gate 324. As a result when the maximum length code word is detected by detector 330, the pulse generated by AND gate 332 in FIG. 4 will not clear the flip-flop 307, and therefore the 16th additional selected sample following a sample for which an address word has been coupled into the data register 320 will still produce a continuing-run pulse on line 314 if it is accompanied with a transmit signal on line 119. The output of AND gate 332 in FIG. 4 will still cause counter 323 to be reset, however, and therefore this 16th additional selected sample will produce a count of one in the counter.

The additional apparatus in FIG. 4 which is necessary to provide the desired change in operation is designated by identifying numerals having a 4 as the hundreds digit. A detector circuit 401 having its inputs connected to the output lines 326 through 329 of counter 323 provides an output energizing signal to one input of an AND gate 402 when a binary word equivalent to 14 is present on lines 326 through 329. If the 15th additional sample is accompanied with a transmit signal, the resulting continuing-run pulse which is generated on line 314 causes a second input of AND gate 402 to be energized. Due to the inherent delay within run length counter 323, AND gate 402 will provide an energizing pulse at its output before the output of counter 323 changes from the digital word equivalent to 14. The output energizing pulse from AND gate 402 is coupled through an OR gate 403 into stage $S_1$ of the flag register 321. The other input of OR gate 403 is connected to receive the start-of-run pulse from line 313 as described hereinabove in connection with the operation of the apparatus shown in FIG. 3. In addition, the energizing pulse from AND gate 402 is coupled through a delay network 404 having a delay time equal to 3Δ seconds. The energizing pulse from the output of delay network 404 is coupled through an OR gate 405 to the shift inputs of registers 320 and 321. The other input of OR gate 405 is connected to the output of OR gate 360 which operates in exactly the same way as described hereinabove in connection with FIG. 3 to provide shifting pulses to the registers 320 and 321. As a result, the continuing-run pulse which appears simultaneously with the amplitude word on bus 122 corresponding to the 15th additional selected sample causes an energizing pulse to be coupled into stage $S_1$ on flag register 321, in addition to coupling the amplitude word on bus 122 into cells $C_4$ and $C_5$ of data register 320.

The registers 320 and 321 are shifted two places to the right by the two energizing pulses produced at the output of OR gate 360 by the continuing-run pulse on line 314. An interval of time later equal in duration to Δ seconds after the second pulse from OR gate 360, the energizing pulse from delay network 404 causes the registers 320 and 321 to be shifted an additional space to the right. As a result, the energizing signal previously entered in stage $S_1$ is moved into the stage $S_4$ position, and the amplitude information from the 15th additional sample is moved into cells $C_7$ and $C_8$ leaving cell $C_6$ empty in order to accommodate a code word at a later time when the energizing signal now in stage $S_4$ is shifted into the stage $S_{34}$ position. In all other respects, the operation of the apparatus shown in FIG. 4 is identical to that described hereinabove in connection with FIG. 3.

In summary of the FIG. 4 apparatus, an output from detector 401 produced by a selected sample corresponding number to one less than the maximum number which can be indicated by a single code word, in combination with the continuing-run pulse produced by the selected sample corresponding to the maximum valued code word, causes a logical 1 to be inserted into stage $S_1$ of flag register 321 and also causes an information gap to be created in data register 320. This gap is filled by the appropriate code word when the logical 1 in flag register 320 reaches the last stage position. As a result, every group of selected samples equal in number to 15 or more is followed by a code word which indicates the number of additional selected amplitude values which follow it. Regardless of the number of samples in a run, only one address word is sent for the run by the apparatus shown in FIG. 4.

The receiving shown in my copending application, Ser. No. 749,770, filed Aug. 2, 1968, can easily be modified by those skilled in the art to provide a receiver which places the transmitted amplitudes into the proper locations of a receiver frame memory. Briefly, the amplitude corresponding to the transmitted address word is located and stored in the frame memory in a fashion identical to that described in the above-identified copending application. In order to accommodate the amplitude values whose address words are not transmitted, a register is added to store the code word, and the amplitude words, equal in number to the value of the code word, are stored in the frame memory locations following the location corresponding to the transmitted address word.

I claim:

1. In a redundancy reduction system in which plural samples of the amplitude of a signal are taken during each successive time interval, means for generating an address for each sample which identifies the location of said each sample within its respective time interval, means for generating a signal which identifies selected samples, means responsive to the identifying signal for generating a code word for each selected sample which follows a sample not selected, the value of said code word being an indication as to the number of selected samples in address locations which follow said selected sample, and means for transmitting the address, amplitude and code word for said each selected sample followed by the amplitudes for all selected samples indicated by said code word.

2. In a redundance reduction system of the type defined in claim 1 wherein said means for generating an address provides an energizing pulse with each generated address and said manes for generating a code word includes a means having a first, a second, and a third output, said last-mentioned means being responsive to both said signal which identifies selected samples and said energizing pulse for generating a start-of-run signal at said first output when a selected sample follows a sample not selected, a continuing-run signal at said second output when a selected sample follows a selected sample, and an end-of-run signal at said third output when a sample not selected follows a selected sample.

3. In a redundancy reduction apparatus of the type defined in claim 2 wherein said means for generating a code word further includes means for counting continuing-run signals, means for detecting a count of predetermined value in said means for counting, means for resetting to zero the means for counting in response to either an end-of-run signal or an output from said means for detecting a count of predetermined value, and memory means for storing the count value in said means for counting immediately prior to its being reset.

4. In a redundancy reduction system of the type defined in claim 3 wherein said means for transmitting includes a shift register means having a capacity for storing amplitude values of samples at least equal in number to the maximum value of said code word, and a means responsive to said start-of-run signal for entering a code word into said shift register means.

5. In a redundancy reduction system as defined in claim 2 wherein said means for generating the start-of-run signal, the continuing-run signal and the end-of-run signal includes a first delay means for generating a first delayed pulse in response to said energizing pulse, a second delay means for generating a second delayed pulse in response to said first delayed pulse, a flip-flop having a set and a cleared state, means responsive to said identifying signal and said second delayed pulse for setting said flip-flop, means responsive to the absence of said identifying signal and said second delayed pulse for clearing said flip-flop, a first AND gating means for developing said start-of-run signal in response to the simultaneous presence of said identifying signal, the first delayed pulse and the cleared state of said flip-flop, a second AND gating means for developing said continuing-run signal in response to the simultaneous presence of said identifying signal, said first delayed pulse and the set state of said flip-flop, and a third AND gating means for developing said end-of-run signal in response to the absence of said identifying signal, the set state of said flip-flop and said first delayed pulse.

6. In a redundancy reduction system as defined in claim 5 wherein said flip-flop is also cleared in response to an output from said means for detecting a count of predetermined value in said means for counting.

7. In a redundancy reduction system as defined in claim 4 wherein said means for generating a code word further includes a second means for detecting a count of predetermined value in said means for counting, and said means for entering a code word into said shift register means is also responsive to an output from said second means for detecting.

8. Redundancy reduction transmitting apparatus comprising means for generating a plurality of amplitude samples during each predetermined interval of an input signal, means for generating an address word for each amplitude sample which word indicates the relative position of its respective sample in the predetermined interval of said input signal, means for selecting amplitude samples for transmission, each selected sample being identified by the presence of an energizing signal, means for generating a code word for each selected sample which follows a sample not selected, said code word providing an indication as to the number of selected samples which follow said each selected sample in subsequent address positions, means responsive to said energizing signal for assembling in sequence the amplitude, code word and address word of said each selected sample followed by the amplitudes for all samples indicated by said code word, and means for transmitting the information assembled by the last-mentioned means to a receiving location.

9. Redundancy reduction transmitting apparatus as defined in claim 8 wherein the input signal is a video signal having time intervals called frames and time subintervals called lines and said means for selecting amplitude samples for transmission includes a memory means for storing an entire frame of video samples, a subtractor circuit for taking the difference between the amplitude of each new sample and its corresponding sample in said memory means having the same time position in the frame interval, and means for generating said energizing signal if the difference exceeds a predetermined threshold.

10. Redundancy reduction transmitting apparatus as defined in claim 9 wherein said means for assembling in sequence includes a first gating means for generating a start-of-run signal when a selected sample follows a nonselected sample, a second gating means for generating a continuing-run signal when a selected sample follows a selected sample, and a third gating means for generating an end-of-run signal when a nonselected sample follows a selected sample.

11. Redundancy reduction transmitting apparatus as defined in claim 10 wherein said means for generating a code word includes means for counting continuing-run signals, means for detecting a count of predetermined value at the output of said means for counting, means for resetting to zero the means for counting in response to either a end-of-run signal or an output from said means for detecting a count of predetermined value, and means for storing the last count value at the output of said means for counting before the latter means is reset to zero.

12. Redundancy reduction transmitting apparatus as defined in claim 11 wherein said means for assembling includes a data register having a plurality of storage cells with the capacity to store a code word and amplitudes for samples equal at least in number to the maximum number of selected samples which can be indicated by said code word, a flag register for storing a start-of-run signal, and means for shifting both the data register and flag register in response to both start-of-run and continuing-run signals.

13. Redundancy reduction transmitting apparatus as defined in claim 11 wherein said means for assembling further includes a means responsive to said means for detecting a count of predetermined value for generating a start-of-run signal if the next sample following the one corresponding to the count of predetermined value is a selected sample.

14. Redundancy reduction transmitting apparatus as defined in claim 12 wherein said means for generating a code word further includes a second means for detecting a count of predetermined value, and said means for assembling further includes a means responsive to said second detecting means for storing a signal in said flag register.